Patented Aug. 24, 1948

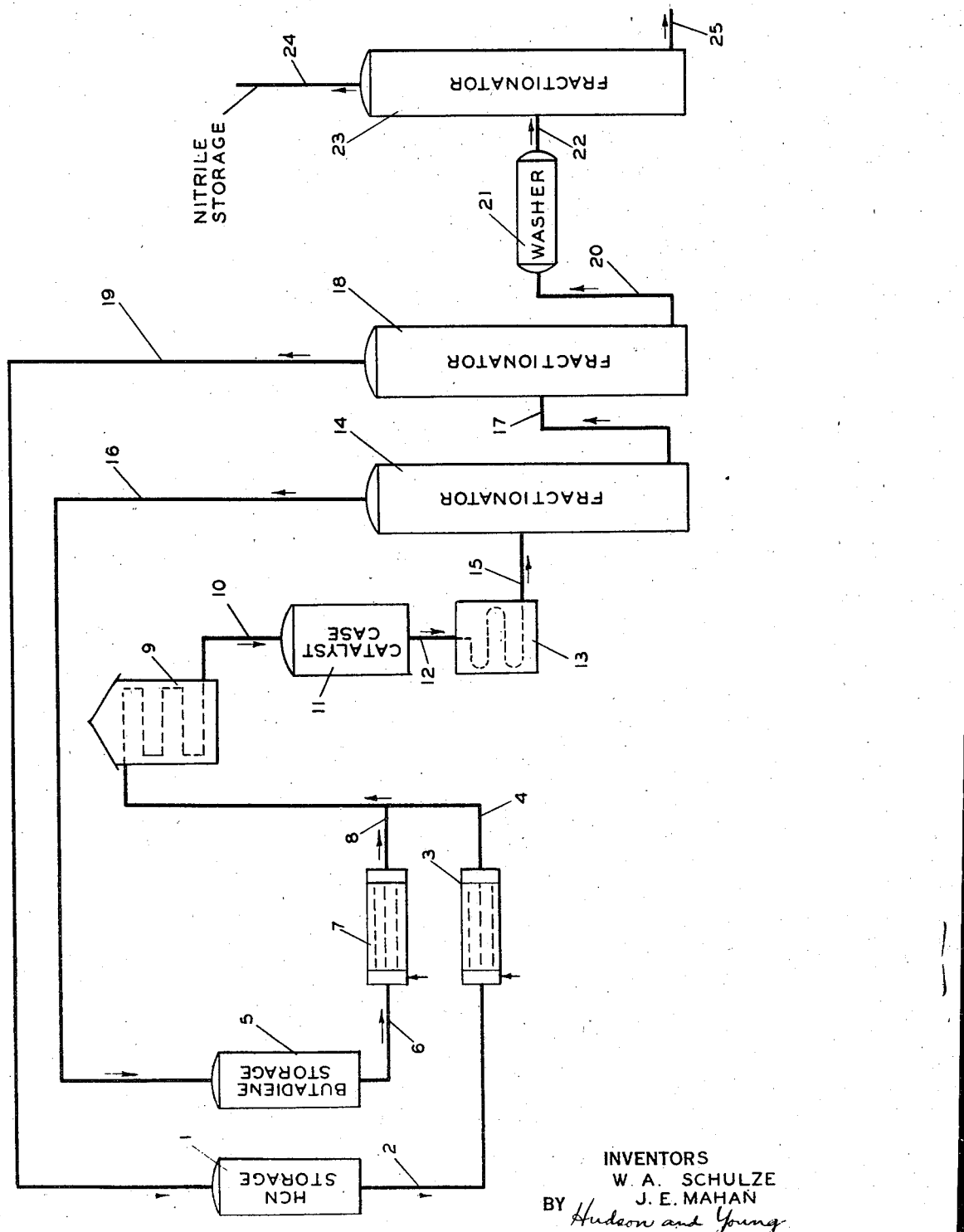

2,447,600

UNITED STATES PATENT OFFICE 2,447,600

PRODUCTION OF UNSATURATED NITRILES

Walter A. Schulze and John E. Mahan, Bartlesville, Okla., assignors to Phillips Petroleum Company, a corporation of Delaware Application May 4, 1944, Serial No. 534,162

10 Claims. (Cl. 260—464)

This invention relates to the production of organic cyanides or nitriles of unsaturated organic acids by the direct interaction of conjugated diolefins and hydrocyanic acid or hydrogen cyanide. More specifically, the present invention relates to the vapor-phase reaction between conjugated diolefins and hydrocyanic acid or hydrogen cyanide over a solid contact catalyst. Still more specifically, this invention relates to the vapor-phase addition of hydrocyanic acid or hydrogen cyanide to conjugated diolefins in the presence of a solid cuprous chloride catalyst to yield unsaturated nitriles or alkenenitriles, both aliphatic and cycloaliphatic.

The value of cyanides or nitriles as intermediates in organic synthesis has long been recognized. A wide variety of products, such as acids, aldehydes, ketones, amines and the like, can be derived from such intermediates. Unsaturated nitriles undergo analogous reactions, thus giving rise to unsaturated analogs. Furthermore, in many instances, saturated compounds can be prepared by simple hydrogenation of the endproducts of reaction. More recently, unsaturated nitriles have been in demand as co-monomers for use in the synthetic-rubber and synthetic-resin industries.

The utility of nitriles in general has not been fully realized in the past due to the lack of economical processes for their manufacture. The prior art reveals for their preparation only such classical reactions as those of alkenyl halides with hydrogen cyanide, dehydration of amides of unsaturated acids, and dehydration of cyanohydrins. In most instances, these methods suffer from such limitations as low yields, severe reaction conditions and especially, difficulty of obtaining suitable starting materials. A recent development proposes the preparation of alkenenitriles by vapor-phase reaction between an unsaturated acid and ammonia over a quartz catalyst at approximately 900° F.

It is an object of the present invention to provide a process for the preparation of unsaturated nitriles by the direct addition of hydrogen cyanide to conjugated diolefins in vapor phase in the presence of a solid cuprous chloride catalyst.

Another object is to provide a simple and economical process for the manufacture of alkenyl and cycloalkenyl nitriles by the direct addition of hydrogen cyanide to aliphatic and alicyclic conjugated diolefins.

Further objects of the invention, some of which are referred to hereinafter, will be apparent to those skilled in the art to which the invention pertains.

We have discovered that the direct interaction of hydrogen cyanide and conjugated diolefins can be effected in the presence of a solid cuprous chloride catalyst. This reaction, as illustrated below, with butadiene, the simplest conjugated diolefin, has not heretofore been described either as a catalytic or non-catalytic reaction:

$$\underset{\text{1,3-butadiene}}{CH_2=CH-CH=CH_2} + HCN \rightarrow \underset{\text{3-pentenenitrile}}{CH_3-CH=CH-CH_2-CN}$$

The above equation depicts 1,4 addition of hydrogen cyanide to the diene; however, it is not intended that the invention should be limited to this mechanism, since in some instances, depending on the nature of the diene and reaction conditions, the addition of hydrogen cyanide may follow a different course.

The synthesis of unsaturated nitriles according to the present invention is conveniently carried out by passing a vaporized mixture of hydrogen cyanide and conjugated diolefin, with or without an inert diluent, over a porous and substantially anhydrous cuprous chloride catalyst. A specific embodiment of the present process is illustrated in the accompanying drawing, which comprises a simplified flow-diagram of a continuous process in which 1,3-butadiene is employed as the conjugated diolefin for the production of pentenenitrile (butenyl cyanide or propenylacetonitrile). Liquid hydrogen cyanide is withdrawn from storage tank 1 through conduit or line 2 to vaporizer 3 and thence by conduit or line 4 to heater 9. Butadiene in tank 5 is transferred by way of line 6, vaporizer 7 and line 8 to heater 9. The two gaseous feed streams are combined just ahead of heater 9, preferably in such proportions that there is a molecular excess of one of the reactants. The mixture of butadiene and hydrogen cyanide is preheated to 500° to 575° F. in tube furnace 9 and the hot gaseous mixture is discharged through line 10 into catalyst case 11 containing substantially anhydrous cuprous chloride on a suitable support. The temperature within the case may rise to as high as 650° F. under controlled conditions due to the exothermic nature of the reaction. Means for dissipating this exothermic heat of reaction may comprise the use of internal cooling coils or the introduction of an inert gaseous coolant at various points along the length of the catalyst case.

The effluent from the catalyst case is conducted through line 12 to cooler 13 in which the temperature of the stream is reduced to about 300° F. prior to entering fractionator 14 from line 15.

Unreacted butadiene is taken overhead through line 16 to storage tank 5 while the kettle product is transferred through line 17 to fractionator 18. Substantially pure hydrogen cyanide is removed via line 19 to storage tank 1. The kettle product from 18, which contains traces of hydrogen cyanide, is conducted through line 20 to washer 21, in which it is washed with aqueous sodium hydroxide solution, and thence by line 22 to fractionator 23. The overhead product is comprised of substantially pure pentenenitrile and is taken to storage via line 24. The kettle product from fractionator 23, which consists mainly of polymeric material, is withdrawn through line 25. The catalyst may be regenerated by passing a reducing gas thereover, but is preferably removed and regenerated by other conventional methods.

The conjugated diolefins which may be used in the process of the present invention may be obtained from any convenient source and include both aliphatic and alicyclic or cycloaliphatic derivatives. More specifically, the conjugated diolefins which may be used include 1,3-butadiene and its homologs as well as 1,3-cyclopentadiene, 1,3-cyclohexadiene and their respective homologs. Piperylene (1,3-pentadiene) and isoprene (2-methyl-1,3-butadiene) are particularly contemplated.

The catalyst for use in the process of the present invention comprises substantially anhydrous cuprous chloride. The cuprous chloride should be employed in a form offering minimum resistance to the flow of vapor-phase reactants through the catalyst zone. The catalyst may be prepared in the form of pellets of cuprous chloride associated with an inert binder or the catalyst may be deposited on an adsorbent or non-adsorbent carrier material. A simple and convenient method of preparing a suitable catalyst consists merely of commingling anhydrous cuprous chloride with a fibrous material such as asbestos fibers. Another catalyst composition which is especially applicable for use in commercial units comprises the product obtained by impregnation of an adsorbent carrier material such as activated charcoal, bauxite, fuller's earth and the like, with a solution of cupric chloride and subsequent reduction of the cupric chloride to the cuprous state with gaseous sulfur dioxide, solutions of sulfites, bisulfites, thiosulfates and mercaptans or similar reducing agents. The catalyst is then dehydrated with a non-oxidizing gas such as nitrogen or gaseous hydrocarbons. The preparation of such adsorbent catalysts and their regeneration can be carried out in the catalyst case to provide a catalytic material substantially free of non-active cupric salts.

Instead of cuprous chloride, other cuprous salts, particularly cuprous cyanide, may be used as an active component of the catalyst, to replace cuprous chloride completely or partially.

Under vapor-phase operating conditions and at atmospheric to low superatmospheric pressures, cuprous chloride promotes nitrile formation at temperatures within the range from approximately 200° to approximately 1000° F. with the preferred intermediate range of approximately 400° to approximately 700° F. being most generally desirable. Operating pressures at the above temperatures do not usually exceed 100 pounds per square inch gage, although the preferred pressure range is approximately atmospheric to approximately 25 pounds per square inch gage.

Since hydrogen cyanide has a pronounced tendency to polymerize with explosive violence under extreme conditions of temperature and pressure, a relatively short contact time or period is desirable. The flow of undiluted liquid feed to the vaporizer should generally be maintained at a rate equivalent to approximately 0.2 to approximately 5 liquid volumes per volume of catalyst per hour, depending on the nature of the conjugated diolefin, the catalyst, and the molecular ratio of the reactants.

In the operation of the process of the present invention is it generally advantageous to charge one of the reactants in a molecular excess over the other to the catalyst zone. Wherever possible an excess of the diene is used in order to insure maximum conversion of hydrogen cyanide. However, in the case of cyclopentadiene and its homologs, which are readily polymerized, it is usually preferable to have an excess of hydrogen cyanide in the reaction mixture. It is also often advantageous to employ n-butane or another inert hydrocarbon diluent, for the purpose of preventing excessive diolefin polymerization and for general control of the exothermic reaction.

In our copending application, Serial No. 534,161, filed on even date herewith, now Patent 2,422,859, issued June 24, 1947, we described the use of a catalyst consisting of an aqueous solution comprising a cuprous salt for reactions similar to those described herein. The use of a solid contact catalyst comprising a cuprous salt has many distinct advantages not possessed by liquid catalysts. These advantages, some of which are not obvious, include the following:

1. In a vapor-phase reaction, apparatus of much simpler construction may be used. The number of moving parts is greatly reduced and difficulties from corrosion are substantially obviated.

2. Since the reaction is in the vapor phase, provisions for securing intimate contact of the catalyst with the reactants present no great problem. Stirrers are required when liquid catalysts are used and the yield of product is dependent to some extent on the rate of stirring. Power requirements are smaller in vapor phase operation, as a consequence.

3. The reaction in the vapor phase is conducted at a higher temperature, namely, within the range of approximately 400° to approximately 1000° F. The extent of the conversion is generally greater at these higher temperatures and a different equilibrium is attained.

4. Lower pressures may be used in vapor-phase operation.

5. The molecular ratio of the two reactants which are charged to the catalyst zone may be maintained at a different value to produce substantially the same yield of product. This is of especial importance in a reaction in which side-reactions of polymerization may be engendered when the diolefin is in excess and hazards of recovery are present and polymerization with explosive violence may result when the hydrogen cyanide is in excess.

The following examples further illustrate the process of our invention. However, since numerous modifications will be apparent to those skilled in the art, these examples are not to be construed as limitative.

*Example 1*

Pentenenitrile was prepared in substantial yield by passing gaseous 1,3-butadiene and hydrogen cyanide over cuprous chloride deposited on asbestos fibers. The catalyst consisted of 9 parts substantially anhydrous cuprous chloride and 1 part asbestos fiber and was prepared by commingling dry asbestos with cuprous chloride powder and was disposed in a catalyst case. The catalyst was dried at 400° F. in an atmosphere of nitrogen for 12 hours prior to use. A gaseous mixture of 1,3-butadiene and hydrogen cyanide containing 1.8 molecular proportions of butadiene per molecular proportion of hydrogen cyanide was charged to the catalyst case at a rate equivalent to 0.5 liquid volume of mixture per volume of catalyst per hour. The average temperature of the catalyst case varied between 580° F. and 640° F. over an operating period of 5.5 hours. The effluent gases from the catalyst case were passed through an ice-cooled condenser in order to recover the liquid product. This crude product was distilled and then washed with a 30 percent aqueous sodium hydroxide solution and dried over calcium chloride. The yield of mixed pentenenitriles amounted to 74.5 per cent of the theoretical based on the hydrogen cyanide consumed. Fractional distillation of the product indicated that approximately 61.5 per cent by weight thereof was 3-pentenenitrile. The fractionally distilled 3-pentenenitrile had a boiling range of approximately 282° to 288° F.

A sample of the nitrile was hydrolyzed with sodium hydroxide and the resulting unsaturated acid was recovered. The melting point of the p-bromophenacyl ester of the recovered acid was found to be 86–87° C., which is that reported for the same ester of n-3-pentenoic acid. The identity of the nitrile was further substantiated by its reduction to 1-aminopentane (n-pentylamine).

*Example 2*

The procedure described in Example 1 was followed in carrying out the addition of hydrogen cyanide to piperylene (1,3-pentadiene) to yield a mixture of hexenenitriles. The feed consisted of 1 molecular proportion of hydrogen cyanide to 2 molecular proportions of the diene. The liquid mixture was metered to a vaporizing chamber at a rate of 1 liquid volume per volume of catalyst per hour and thence to the catalyst case in which a reaction temperature range of 650° to 675° F. was maintained. The pressure was substantially atmospheric. At the end of 6 hours of operation, the recovery of crude isomeric hexenenitriles amounted to 55 per cent of the theory.

*Example 3*

Cyclopentenylcyanide was prepared by passing 1,3-cyclopentadiene and hydrogen cyanide over cuprous chloride deposited on an adsorbent carrier. The catalyst for this reaction was prepared by spraying a 35 per cent aqueous solution of cupric chloride on dry fullers' earth until the granules appeared slightly moist. Final preparation of the catalyst was carried out in a laboratory catalyst tube by reducing the cupric copper to the cuprous state with sulfur dioxide. The catalyst was dried for 8 hours in a stream of nitrogen at 400° F. The cyclopentadiene feed was prepared by blending 1 volume of the diene with 4 volumes of n-butane. A vaporized mixture of the diluted diene feed and hydrogen cyanide was charged to the catalyst case in such proportions that the mol ratio of hydrogen cyanide to cyclopentadiene was approximately 2:1. The flow rate of the charged vapor feed comprising cyclopentadiene, n-butane and hydrogen cyanide was held at approximately 2.5 liquid volumes per volume of catalyst per hour and the reaction temperature was maintained at 425° to 450° F. The effluent from the catalyst case was passed through an ice-water condenser and the major portion of the butane diluent was vented. The condensed crude product was fractionally distilled to remove the excess hydrogen cyanide. Further vacuum fractionation of the stabilized material gave a product fraction of cyclopentyl cyanides having a distilling range of 150° to 160° F. at a pressure of 15 mm. of mercury (boiling range 320° to 335° F. at atmospheric pressure).

Obviously many modifications of the invention as hereinbefore set forth may be made without departing from the scope thereof and therefore no limitations are to be imposed thereupon except as specified in the appended claims.

We claim:

1. A process for the production of a nitrile of an unsaturated carboxylic acid which comprises mixing a substantially anhydrous conjugated diolefin hydrocarbon with substantially anhydrous hydrogen cyanide in vapor phase, and passing the resulting mixture of vapors over a substantially anhydrous cuprous salt under substantially anhydrous conditions and at a temperature between 400° and 1000° F. and at a pressure less than 100 pounds per square inch gage and such that the reaction mixture is in vapor phase, and recovering a resulting nitrile of an unsaturated carboxylic acid so produced.

2. A process for the production of a nitrile of an unsaturated carboxylic acid which comprises mixing vapors of hydrogen cyanide and a conjugated diolefin selected from the group consisting of aliphatic and cycloaliphatic diolefin hydrocarbons and passing the resulting mixture of vapors into contact with a solid catalyst containing substantially anhydrous cuprous chloride at a temperature between 400° and 1000° F. and under substantially anhydrous conditions and at a pressure less than 100 pounds per square inch gage and such that the reaction mixture is in vapor phase, and recovering a resulting nitrile of an unsaturated carboxylic acid so produced.

3. A process for the production of a nitrile of an unsaturated carboxylic acid which comprises reacting together hydrogen cyanide and a conjugated diolefin selected from the group consisting of aliphatic and cycloaliphatic diolefin hydrocarbons in the vapor phase and in the presence of a solid contact catalyst comprising a substantially anhydrous cuprous salt at a temperature within the range of approximately 400° to approximately 1000° F. at a pressure not substantially in excess of 100 pounds per square inch and such as to maintain the reaction mixture in vapor phase, and under anhydrous conditions.

4. A process for the production of an alkenenitrile which comprises reacting together hydrogen cyanide and a conjugated aliphatic diolefin hydrocarbon in vapor phase and under substantially anhydrous conditions, in the presence of a solid contact catalyst comprising a substantially anhydrous cuprous salt at a temperature between approximately 400° and 1000° F. and at a pressure not substantially in excess of 100 pounds per square inch, and such as to maintain the reaction mixture in vapor phase.

5. A process for the production of a cycloalkenyl cyanide which comprises reacting together hydrogen cyanide and a conjugated cycloaliphatic diolefin hydrocarbon under substantially anhydrous conditions and in the vapor phase, in the presence of a solid contact catalyst comprising a substantially anhydrous cuprous salt at a temperature within the range of approximately 400° to approximately 1000° F. and at a pressure not substantially in excess of 100 pounds per square inch, and such as to maintain the reaction mixture in vapor phase.

6. A process for the production of a n-pentenenitrile which comprises reacting together 1,3-butadiene and hydrogen cyanide under substantially anhydrous conditions and in the vapor phase and in the presence of a solid contact catalyst comprising substantially anhydrous cuprous chloride at a tempertaure within the range of approximately 400° to approximately 700° F. and at a pressure within the range of approximately atmospheric to approximately 25 pounds per square inch gage and thereby effecting direct interaction of said hydrogen cyanide with said 1,3-butadiene with the formation of n-pentenenitrile.

7. A process for the production of a hexenenitrile which comprises reacting together an aliphatic conjugated pentadiene and hydrogen cyanide under substantially anhydrous conditions and in the vapor phase and in the presence of a solid contact catalyst comprising substantially anhydrous cuprous chloride at a temperature within the range of approximately 400° to approximately 700° F. and at a pressure within the range of approximately atmospheric to approximately 25 pounds per square inch gage and thereby effecting direct interaction of said hydrogen cyanide with said pentadiene with the formation of hexenenitrile.

8. A process for the production of a cyclopentenyl cyanide which comprises reacting together 1,3-cyclopentadiene and hydrogen cyanide under substantially anhydrous conditions and in the vapor phase and in the presence of a solid contact catalyst comprising substantially anhydrous cuprous chloride at a temperature within the range of approximately 400° to approximately 700° F. and at a pressure within the range of approximately atmospheric to approximately 25 pounds per square inch gage and thereby effecting direct interaction of said hydrogen cyanide with said 1,3-cyclopentadiene with the formation of cyclopentenyl cyanide.

9. A continuous process for the production of a n-pentenenitrile which comprises continuously passing a mixture of hydrogen cyanide and 1,3-butadiene in the molecular ratio of approximately 1:2 in the vapor phase and under substantially anhydrous conditions into contact with a solid contact catalyst comprising substantially anhydrous cuprous chloride supported on a substantially inert carrier material at a temperature within the range of approximately 400° to approximately 700° F. and at a pressure within the range of approximately atmospheric to approximately 25 pounds per square inch gage, continuously withdrawing the product nitrile and separating said product nitrile from unconverted reactants associated therewith, and returning the unconverted reactants to contact with the solid contact catalyst.

10. A continuous process for the production of a nitrile of an unsaturated carboxylic acid, which comprises continuously passing a mixture of hydrogen cyanide and a conjugated diolefin hydrocarbon having at least 4 and not more than 6 carbon atoms per molecule, in the vapor phase and under anhydrous conditions into contact with a solid catalyst comprising an anhydrous cuprous salt at a temperature within the range of 400° to 700° F. and a pressure not greater than 25 pounds per square inch gage and a flow rate of the total reactants, measured as a liquid, between 0.2 and 5 liquid volumes per volume of catalyst per hour, and separating from resulting reaction products a nitrile so produced.

WALTER A. SCHULZE.
JOHN E. MAHAN.

REFERENCES CITED

The following references are of record in the file of this patent:

UNITED STATES PATENTS

| Number | Name | Date |
| --- | --- | --- |
| 2,102,611 | Carothers et al. | Dec. 21, 1937 |
| 2,123,504 | Dykstra | July 12, 1938 |
| 2,322,696 | Kurtz et al. | June 22, 1943 |

OTHER REFERENCES

Kharasch et al.: J. Org. Chem., vol. 2, pages 489–496 (1937).